C., W. E. AND O. M. KENDALL, AND W. M. HANCOCK.
VISIBLE INDICATING SYSTEM FOR OIL DISPLAYING AND DISPENSING SYSTEMS.
APPLICATION FILED JUNE 20, 1921.
1,417,530.
Patented May 30, 1922.
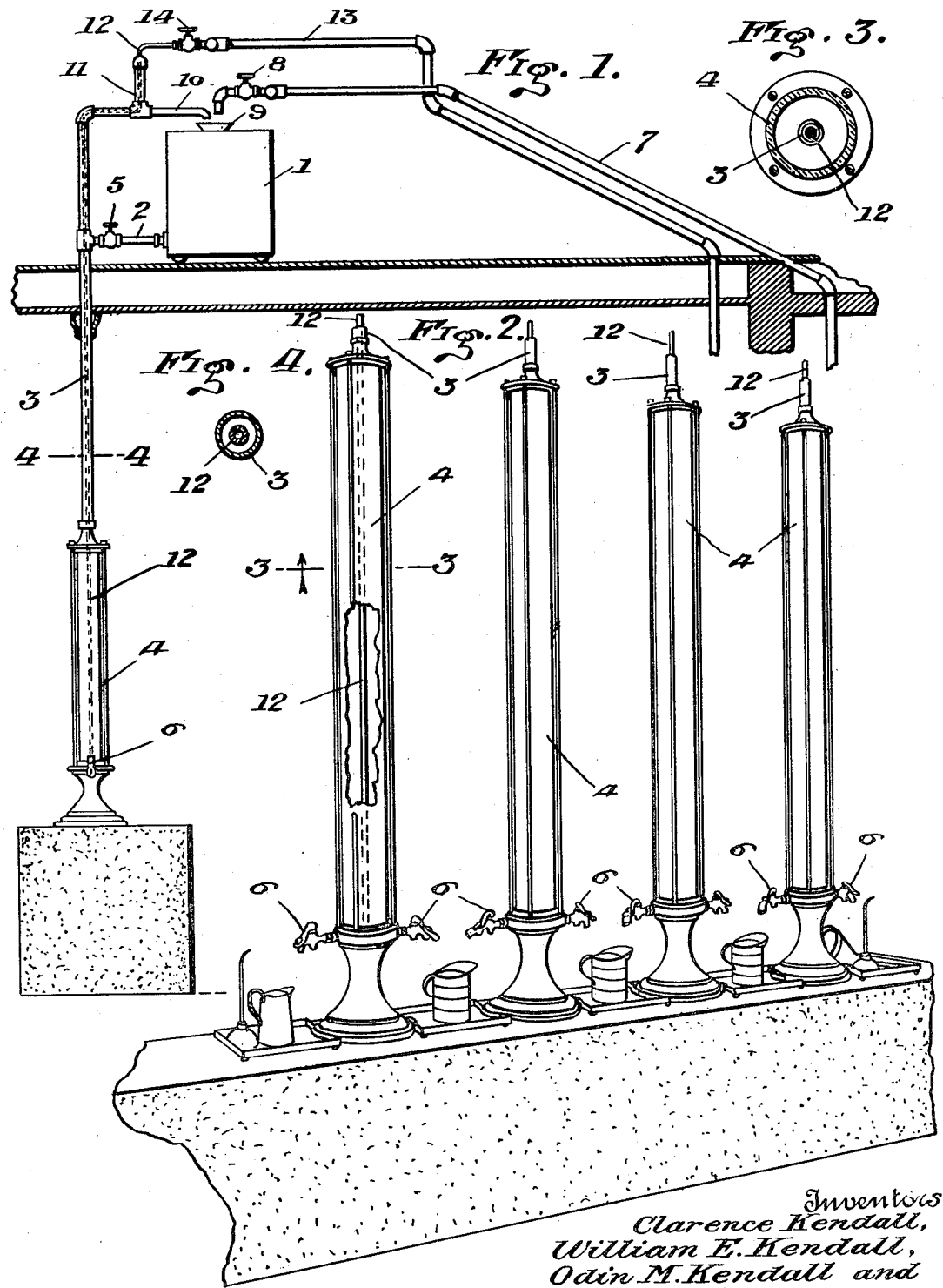

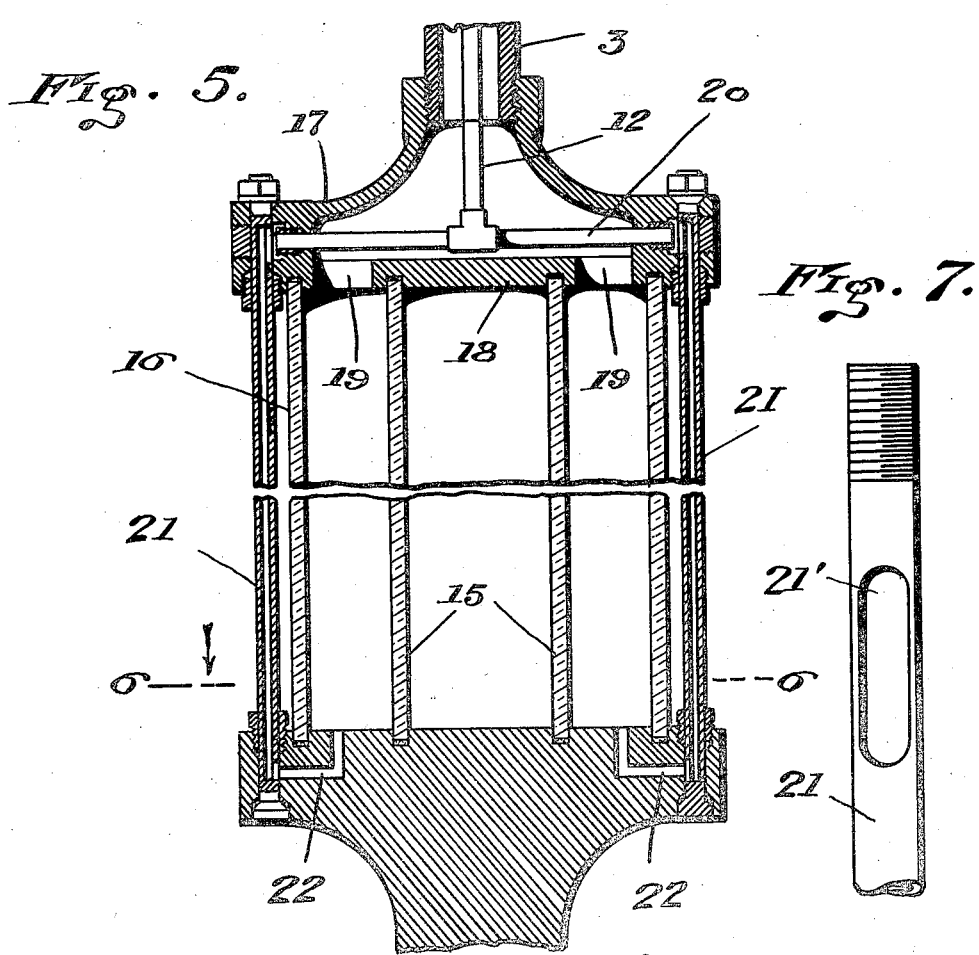
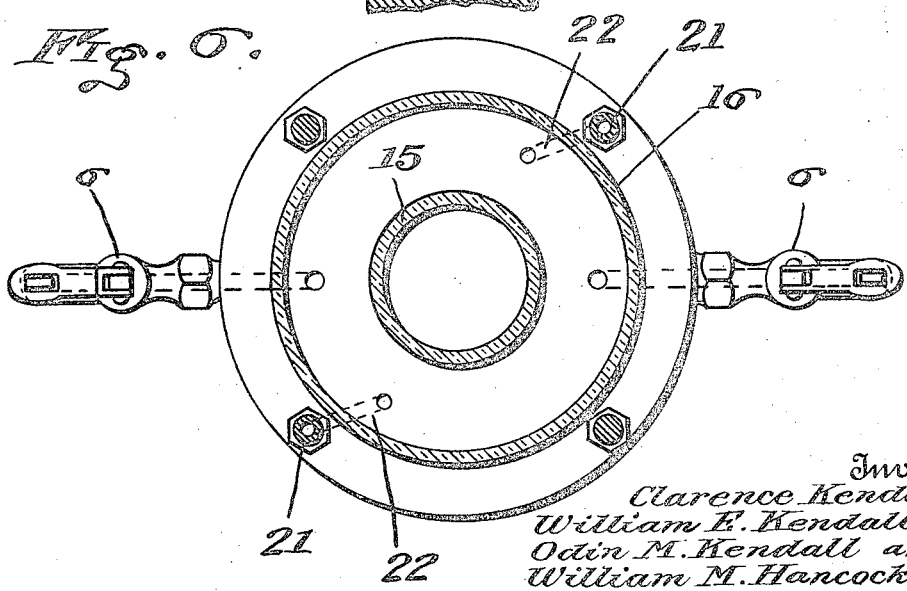

UNITED STATES PATENT OFFICE.

CLARENCE KENDALL, WILLIAM E. KENDALL, ODIN M. KENDALL, AND WILLIAM M. HANCOCK, OF HOUSTON, TEXAS.

VISIBLE INDICATING SYSTEM FOR OIL DISPLAYING AND DISPENSING SYSTEMS.

1,417,530. Specification of Letters Patent. Patented May 30, 1922.

Application filed June 20, 1921. Serial No. 479,156.

*To all whom it may concern:*

Be it known that we, CLARENCE KENDALL, WILLIAM E. KENDALL, ODIN M. KENDALL, and WILLIAM M. HANCOCK, citizens of the United States, residing at Houston, in the county of Harris and State of Texas, have invented certain new and useful Improvements in Visible Indicating Systems for Oil Displaying and Dispensing Systems, of which the following is a specification.

The present invention relates to visible viscosity indicating systems for use with visible lubricating oil dispensing and displaying systems for use in retailing small quantities of oils of different grades to consumers and is intended primarily for use in oil and gasoline automobile filling or supply stations such as are now common on the roads and in cities throughout practically the entire country. In the majority of such systems the oil is first supplied to a suitable storage tank in any one of a number of known ways, and then delivered, as required, to a dispensing chamber or compartment, from which it is drawn off in the small retail quantities required. Various grades of lubricating oils have been developed to meet the varying requirements of various engines and machinery, the bigger and more powerful engines as a general rule taking the heavier grade of oil, the smaller and less powerful engines the lighter grades of oil, and it is of great importance that the correct grade of oil be supplied to the particular engine. This is a matter of much concern to the intelligent automobile driver and this invention has particularly in view the facilitating of the selection of the particular grade of oil required both by comparison with adjacent columns of different grades of oil for indication by color and also by comparison as to different degrees of viscosity, as well as by individual indication of viscosity and color, and further has in view the visual assurance that the oil actually supplied to the engine by the filling station attendant is oil of the grade so selected.

The various grades of oil, from the standpoint of the layman, are distinquished by trade-name or by their specific gravity and degree of viscosity, and their different colors and shades. Heretofore each system has used but one grade of oil at a time and there has been no reliable quick way to indicate to the purchaser, either by comparison as to color or shade of color or as to viscosity with other grades of oil nearby, the particular grade the purchaser was getting, the only indication available being by the use of some trade name or by word of mouth of the vendor, so that heretofore the purchaser has had to rely entirely on the integrity of the dealer. It is the purpose of this present invention to remedy this condition and to provide a means whereby the purchaser may know exactly what grade of oil he is obtaining without relying to the least degree upon the vendor.

Also, since only one grade of oil was used by each system heretofore, no means was provided for supplying different grades of oil to different parts of the system. Consequently, a system which will maintain constantly a supply of a variety of different grades in transparent column form containers closely adjacent each other for purposes of comparison as to different colors, shades and different degrees of viscosity and which will quickly indicate, and check up, by such comparison, each grade, has many advantages over the systems heretofore in use.

The main objects of this invention are to avoid the objections above set forth and provide a simple and efficient system by which a number of different grades of lubricating oil may be kept constantly ready for immediate delivery to the consumer, and their various comparative grades positively proved and visibly indicated. Another object is to provide such a system in which any one of the various grades may be taken by the same pump from its source of supply and forced through a single oil supply line to any desired part or branch of the system.

Further objects will appear from the following specification and will be set out more particularly in the appended claims.

In the drawings:

Figure 1 represents an end view of a dispensing system in which my viscosity and color indicating system is embodied:

Figure 2, a perspective view thereof;

Figure 3, a view on line 3—3 of Figure 2;

Figure 4, a view on line 4—4 of Figure 1;

Figure 5, a central vertical cross-section through a modified form of dispensing, displaying and indicating chamber or receptacle;

Figure 6, a top plan view of the base of the said modified form of receptacle, with stay bolts in cross-section and cylinders removed; and Figure 7 represents a detail view of the upper part of one of the tubular stay bolts, showing the elongated opening through the side wall thereof.

Although a battery of four dispensers has been shown in the drawings, it is obvious that the invention is not limited to any particular number of receptacles or display dispensing indicating chambers, the illustration merely being taken from a system in actual use where four such chambers or receptacles meet the needs of the particular station. Obviously, the number may be either greater or less than the number shown, being merely of sufficient number to meet the demands made on the station by the patrons thereof.

A suitable strong support is necessary both for the dispensing displaying indicating receptacles or chambers and for the storage tank or tanks, and, preferably, the storage tanks or reservoirs will be supported at a higher level than the dispensing displaying indicating chambers or receptacles so that the oil may flow readily by gravity from the respective storage tanks to the respective receptacles.

In the drawings the dispensing displaying indicating chambers or receptacles are shown as mounted on a concrete block, one block being used for the battery, while the storage tanks are shown as standing on the floor above in a suitable structure in which the system is housed. From the tank 1 a branch pipe 2 leads to the feed pipe 3 through which the lubricating oil flows by gravity to its respective chamber or receptacle 4. The branch 2 has a valve 5 by which the flow may be stopped at any time. The wall of the receptacle 4 is preferably continuous and may be an exact circle in cross-section, so as to form a cylindrical column, and is of transparent material. Cocks or bibs 6 are provided through which the desired qualities of oil may be drawn off from the receptacle 4 as required. In order to fill one of the tanks 1, an oil pump of any usual and well known form may be used, with connections by which it may draw oil from a tank wagon, tank car, or other suitable source of supply. From this pump an oil supply pipe line 7 leads to main from which branch pipes lead to each storage tank 1, a valve 8 being provided in each such branch pipe to control the supply to the various storage tanks 1. Thus, by closing all the valves 8 but one, the particular grade of oil for the particular storage tank to which the branch pipe in which the valve 8 is left open, may be pumped to said tank. Then, by closing that valve 8 and opening one of the others the operation may be repeated, and so on until all of the storage tanks are filled, thus requiring but one pump and one supply line of pipe for all of the storage tanks 1. Each tank 1 is provided with a funnel opening 9 through which the oil passes to the interior of the tank.

Each feed pipe 3 is extended upward beyond its branch connection 2 and then across above the top of the corresponding tank 1 so that its open end 10 lies above the funnel opening 9. A short distance from its end it is provided with an upwardly extending communicating branch or arm 11. A small diameter copper air tube 12 passes through the branch 11, feed pipe 3, the receptacle 4 and has its lower end within the receptacle 4 and close to the upper face of the bottom thereof. It is much smaller in diameter than feed pipe 3, leaving a considerable cylindrical space between the two. The opposite end of this tube communicates with the air pipe 13 provided with a control valve 14 and receives air under pressure from a suitable source of supply of compressed air. In the case of two or more receptacles 4, as shown, a main may be used leading from pipe 13 and provided with a branch for each receptacle 4, a controlling valve 14 being arranged in each branch, so that the flow of air to any one or more of the receptacles 4 may be either entirely cut off or reduced or controlled as much as desired.

The rate of travel of air bubbles through a liquid being dependent upon the nature of the liquid, it stands to reason that they will travel upward through a mass of one grade of lubricant or lubricating oil at a different rate than they will through a lubricating oil of a different grade. This fact is made use of in the present invention, to indicate to the consumer in a comparative way the grade of oil he is getting. For instance, in the case here shown, there are four receptacles each containing an oil of a different grade. Now, if the consumer wishes to get the lightest grade of oil, he observes the bubbles rising in the whole battery of containers, compares their rate of ascent in the various containers and then has his oil drawn from that container in which the bubbles rise most rapidly. At the same time he compares the colors of the oils to see that he is getting the particular kind of oil, as well as the particular grade of oil, that he asks for. The air passing from the lower end of tube 12 forms these bubbles which float upward through the oil in the receptacles 4 and on up through the oil in feed pipes 3. Each bubble, of course, carries a certain small amount of oil with it which, as soon as the bubble bursts, is deposited. During continuous operation the accumulation is appreciable and worth saving. Furthermore, if it is returned to the tank, the muss otherwise resulting is avoided. For this reason the open end 10 is extended over the funnel opening 9. In this way, any accumulation which would otherwise be spattered over the top of pipe 3 is drained off through the open pipe end 10 which is continued beyond branch 11 and its enclosed air-tube 12.

As the air bubbles form and rise in the oil they are clearly visible through the transparent cylindrical walls of containers 4 and their rate of travel in the several cylinders very quickly compared at a glance, so that there is no delay in a customer selecting, himself, the exact grade he wishes.

The receptacles 4 may be constructed in any manner desired, the main object being to provide for the rise of the air bubbles and to have them readily visible through the wall of the dispenser and to provide for vision, uninterrupted save by the contained oil, from side to side of each container or through the mass of oil. One way of constructing them is to have large glass cylinders for the walls, brass heads with an opening for pipes 3, and brass bases with lateral passages for connecting the bibs 6, the heads and bases being provided with suitably packed seats to receive the cylinder ends, and being securely clamped against the cylinder ends by screw-threaded tie rods extending the full lengths of the receptacles and through the respective heads and bases, nuts being turned onto the threaded ends of the tie rods to complete the clamping operation. Obviously, they may be equally well constructed in various other ways, the method described simply being one successfully used in one instance in which the invention has been actually installed.

In Figures 5, 6 and 7 a modified form is shown. This form is particularly adapted to large diameter cylinders. In the large diameter cylinders the ascending bubbles are easily hidden by the outer portion of the mass of oil which also because of its mass is difficult to see through and loses its color and does not make so attractive an appearance. By this modification the size of cylinder may be as large as desired, while the thickness of the wall of the column of oil may be maintained the same, regardless of such diameter. This is accomplished by having, instead of a single cylinder, two concentric cylinders, between which the oil column is confined, the inner cylinder being empty. This allows a certain amount of light to pass through the oil and shows up the color much better in the larger diameter receptacles 4 than where there is no such inner cylinder and makes a relatively thin sheet in which the bubbles are clearly visible. In all sizes from six inches up in diameter this modified form is most desirable as more clearly showing the air bubbles and as showing up better the color of the oil and making a more attractive display. Preferably, the base is provided with concentric grooves with an annular space between, the grooves being adapted to receive suitable packing on which are seated the ends of the inner and outer concentric cylinders 15 and 16, respectively. The head or top plate for seating the upper ends of the cylinders and closing the inner is formed as an outer shell 17 and inner disc 18, the disc being spaced from but carried by the shell, the connection between the two being in the nature of a spider or plurality of short ribs integral with both the shell and disc. This leaves an annular passage 19 communicating with the upper end of the space between the two cylinders. The oil supply pipe communicates with the space between the shell and disc, so that oil may flow therefrom directly into the space between the two cylinders. In this form the air for creating the indicating bubbles passes down through two of the stay bolts or clamping rods. For this purpose a tube 20 is passed diametrically through the space between the shell and head and communicates at its opposite ends with elongated openings 21' in the upper part of each of two diametrically opposite hollow stay bolts 21. The air passing through tube 20 and entering the stay bolts passes down through the respective stay bolts 21 and out through openings in each of the respective bolts 21 near their lower ends into corresponding cooperating L-shaped bores or passages provided in the base to cooperate with the respective hollow stay bolts 21. Each of these two bores opens upwardly into the space between the two cylinders so that the air passing therethrough will be free to rise through the oil and will create clearly visible indicating bubbles. It will pass out through the annular space 19 and thence upward through the supply pipe 3 as in the preferred form. The two bores are arranged on diametrically opposite sides of their respective base plate and are not arranged radially, but at an angle to the radius, so that the bubbles will be clearly visible from opposite sides of the particular receptacle 4 and will not be hidden by the stay bolts 21. The upper parts of the two hollow stay bolts 21, where they pass through the shell or head 17, are suitably packed both above and below the ends of rod 20 so that there will be no air leakage, due to relative movement between the stay bolts and head or shell as the nuts are tightened. Openings 21' are elongated on account of this same relative movement, of course. The lower ends of the stay bolts, of course, are suitably packed below the L-shaped bores to prevent leakage there. For ease in assembling, the rod 20 is preferably made in two parts with threaded inner ends adapted to be turned into co-operating openings in a small T-head carried by the lower end of the air tube 12.

By using hollow stay bolts 21 the air may be delivered to the inside of the dispensing displaying indicating receptacles 4 in the most attractive way and make a far superior demonstration. This is true of all sizes of receptacles 4 and whether with or without an inner spaced cylinder. Likewise, in the form with two concentric cylinders, it is obvious that one or more air tubes could be run down from the tube 12, through the space between shell 17 and disc 18, through annular opening 19 and to the bottom of the space between the cylinders, but such a disposition would considerably detract from the attractive appearance of the containers 4.

In operation in both forms, of course, when all parts or units of the system are being used, the air pressure will be the same in each one of the several air tubes 12 and will be delivered at exactly the same pressure in each one of the plurality of receptacles 4.

Obviously a number of changes may be made in construction and arrangement of the various parts of the invention without in any way departing from the scope thereof, and it is meant to include all such within this application, wherein only two preferred forms have been disclosed by way of illustration.

Having thus described our invention, what we claim as new and desire to secure by Letters Patent is:

1. A viscosity indicator system for liquid dispensing and displaying systems, comprising a receptacle having transparent walls, an air-supply duct communicating with the interior of said receptacle in the lower portion thereof, means for supplying air under pressure to said duct, means for controlling the degree of pressure of the air so supplied, an outlet pipe communicating with the interior of the upper portion of said receptacle, and a branch pipe communicating with the upper part of said outlet pipe and having an open end arranged to return to the supply reservoir for said receptacle such liquid as may be carried up from said receptacle by the escaping air.

2. A viscosity indicator system for liquid dispensing and displaying systems, comprising a battery of receptacles arranged in adjacency, each receptacle having transparent walls, air-supply ducts communicating with the interior of the respective receptacles in the lower portion thereof, means for supplying air under pressure to said ducts, means for controlling the degree of pressure of the air so supplied, air outlet pipes communicating with the upper portions of the interiors of the respective receptacles, and branch pipes communicating with the upper portions of said pipes respectively and having open ends arranged to return to the respective supply reservoirs such liquids as may be carried up from the respective receptacles by the escaping air.

3. A viscosity and color indicator system for liquid dispensing and display systems, comprising a battery of receptacles arranged in adjacency for purposes of comparison, each receptacle having transparent walls, air-supply ducts communicating with the interior of the respective receptacles in the lower portions thereof, means for supplying air under pressure to said ducts, and means providing communication between the upper portions of the interiors of the respective receptacles and the atmosphere to permit the escape of the air so supplied to the respective receptacles.

4. A viscosity and color indicator system for liquid dispensing and displaying systems, comprising a battery of receptacles arranged in adjacency for purposes of comparison, each receptacle having transparent walls, air supply ducts communicating with the interiors of the respective receptacles in the lower portions thereof, means for supplying air under uniform pressure to all of said ducts in order that the air pressure may be uniform for all of the receptacles, and means for providing communication between the upper portions of the interiors of the respective receptacles and the atmosphere to permit the escape of the air so supplied to the respective receptacles.

5. A viscosity indicator system for liquid dispensing and displaying systems, comprising a receptacle comprising two spaced bodies forming between them a thin space for the reception of liquid, the outer body being transparent, an air supply duct communicating with the lower part of said space, means for supplying air under pressure to said duct, an outlet pipe communicating with the upper portion of said space to permit the escape of air therefrom, and a branch pipe communicating with the upper part of said outlet pipe and having an open end arranged to return to the supply reservoir for said receptacle such liquid as may be carried up from said receptacle by the escaping air.

6. A viscosity indicator system for liquid dispensing and displaying systems, comprising a receptacle comprising two spaced substantially concentric transparent walls forming between them a space for liquid, an air supply duct communicating with the lower part of said space, means for supplying air under pressure to said duct, means for controlling the degree of pressure of the air so supplied, an air escape pipe communicating with the said space and having a part arranged to return to the supply reservoir for said receptacle such liquid as may be carried off from said receptacle by the escaping air.

7. A viscosity and color indicator system for liquid displaying and dispensing systems comprising a battery of receptacles arranged in adjacency for purposes of comparison, each receptacle comprising two spaced transparent bodies forming between them a thin space for the reception of liquid to display the color of said liquid, air supply ducts communicating with the interior of each of said receptacles in the lower portion thereof between the said spaced bodies, means for supplying air under uniform pressure to all of said ducts, air outlet pipes communicating with the liquid receiving space of said receptacles, and branch pipes respectively leading from said outlet pipes and having open ends arranged to return to the respective supply tanks of the respective receptacles such liquids as may be carried off from the said respective receptacles by the escaping air.

CLARENCE KENDALL.
WILLIAM E. KENDALL.
ODIN M. KENDALL.
WILLIAM M. HANCOCK.